US011503692B2

(12) United States Patent
Lee

(10) Patent No.: US 11,503,692 B2
(45) Date of Patent: Nov. 15, 2022

(54) SYSTEM FOR STREET LIGHT LIGHTING CONTROL AND FOR IOT CONTROL FOR MONITORING SOLAR POWER GENERATION

(71) Applicant: SUNG CHANG CO., LTD, Chungcheongbuk-do (KR)

(72) Inventor: Jae Jin Lee, Chungcheongbuk-do (KR)

(73) Assignee: SUNG CHANG CO., LTD, Chungcheongbuk-do (KR)

( * ) Notice: Subject to any disclaimer, the term of this patent is extended or adjusted under 35 U.S.C. 154(b) by 0 days.

(21) Appl. No.: 17/212,122

(22) Filed: Mar. 25, 2021

(65) Prior Publication Data

US 2022/0022301 A1    Jan. 20, 2022

(30) Foreign Application Priority Data

Jul. 17, 2020  (KR) .......................... 10-2020-0088586

(51) Int. Cl.
*H05B 47/115* (2020.01)
*H05B 47/175* (2020.01)
*H02J 7/00* (2006.01)
*F21S 8/08* (2006.01)
*F21S 9/03* (2006.01)

(52) U.S. Cl.
CPC ............ *H05B 47/115* (2020.01); *F21S 8/085* (2013.01); *F21S 9/032* (2013.01); *H02J 7/0048* (2020.01); *H05B 47/175* (2020.01)

(58) Field of Classification Search
CPC .......... F21S 9/032; F21S 8/085; H02J 7/0048; H05B 47/115; H05B 47/175
See application file for complete search history.

(56) References Cited

U.S. PATENT DOCUMENTS

| 2014/0111098 A1* | 4/2014 | Amarin | H05B 47/22 |
| | | | 315/158 |
| 2014/0350716 A1* | 11/2014 | Fly | B65G 1/02 |
| | | | 700/214 |
| 2020/0305246 A1* | 9/2020 | Park | F21S 9/037 |

FOREIGN PATENT DOCUMENTS

| JP | 2014-225377 A | 12/2014 |
| KR | 10-2008-0093268 A | 10/2008 |

(Continued)

*Primary Examiner* — Henry Luong
(74) *Attorney, Agent, or Firm* — Harness, Dickey & Pierce, P.L.C.

(57) ABSTRACT

A system for street light lighting control and for Internet-of Things control for monitoring solar power generation includes a solar panel configured to generate photovoltaic-based electricity using sunlight; a battery configured to store the electricity generated by the solar panel; a solar controller configured to control the battery to store the electricity; and a street light controller configured to control lighting of at least one street light using the electricity stored in the battery, wherein the solar controller includes a battery information detection module configured to detect remaining charge information and discharging time information, which are charging/discharging status information of the battery and a communication module configured to transmit the remaining charge information and discharging time information to a monitoring server, wherein the communication module transmits the charging/discharging status information, the remaining charge information, and the discharging time information to the monitoring server through a low-power wide area network.

6 Claims, 2 Drawing Sheets

(56) References Cited

FOREIGN PATENT DOCUMENTS

KR  10-2014-0004469 U   7/2014
KR  10-2019-0032038 A   3/2019

* cited by examiner

SYSTEM FOR STREET LIGHT LIGHTING CONTROL AND FOR IOT CONTROL FOR MONITORING SOLAR POWER GENERATION

CROSS-REFERENCE TO RELATED APPLICATION

This application claims the benefit under 35 USC § 119(a) of Korean Patent Application No. 10-2020-0088586, filed on Jul. 17, 2020, in the Korean Intellectual Property Office, the entire disclosure of which is incorporated herein by reference for all purposes.

FIELD

The following description relates to street light lighting control, and more particularly, to a system for street light lighting control and for Internet-of-Things (IoT) control for monitoring solar power generation.

BACKGROUND

Street lights are lighting facilities installed at predetermined distances along a street for the traffic safety and prevention of crimes against pedestrians. Here, the term "street" includes any ways used or intended to be used by vehicular traffic or pedestrians. In addition, a street light may only refer to a light for illuminating part of a street, but it is common to refer to a street light pole for fixing the light (hereinafter also referred to as a "street pole") as a street light.

Such street lights are installed in various places, such as highways, major roads in urban areas, commercial district roads, and residential district roads, and various types of street lights suitable for these places are used. That is, street lights to illuminate streets are essentially installed on roads on which vehicles or pedestrians travel.

As light sources of conventional street lights, high-pressure mercury lamps, fluorescent lamps, sodium lamps, and ordinary light bulbs have been used, but in recent years light-emitting diode (LED) lamps with low power consumption and high light efficiency have been used to save energy, and furthermore, the use of solar street lights supplied with solar power is increasing.

However, since the solar street light according to a prior art as described above is always lit regardless of the presence or absence of a vehicle or a person, there is a downside in that energy cannot be efficiently used, which leads to excessive power consumption.

To overcome such a downside, recently, research on a technology that turns on a street light in response to detection of the approach of a vehicle or person is also being conducted.

However, there is a limit to the collection of monitoring information for each street light, and there is a limit to fine lighting control, in particular, there is a problem in which detailed lighting control of a plurality of street lights according to the direction of movement of a person is not performed.

PRIOR ART DOCUMENT

Patent Document (Patent Document 0001) Korean Patent Publication No. 10-2008-0093268

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a system for street light lighting control and for Internet-of-Things (IoT) control for monitoring solar power generation which enables control of individual lighting of a plurality of street lights.

According to the present invention, a system for street light lighting control and for IoT control for monitoring solar power generation includes: a solar panel configured to generate photovoltaic-based electricity using sunlight; a battery configured to store the electricity generated by the solar panel; a solar controller configured to control the battery to store the electricity; and a street light controller configured to control lighting of at least one street light using the electricity stored in the battery, wherein the solar controller includes a battery information detection module configured to detect remaining charge information and discharging time information, which are charging/discharging status information of the battery and a communication module configured to transmit the remaining charge information and discharging time information to a monitoring server, wherein the communication module transmits the charging/discharging status information, the remaining charge information, and the discharging time information to the monitoring server through a low-power wide area network (LPWAN).

The street light controller may detect lighting state information of the street light and transmit the detected lighting state information to the solar controller, and the solar controller may transmit the lighting state information to the monitoring server.

The system may further include a plurality of motion sensors equipped in the street light to detect movement of a person, wherein the movement sensors are radially arranged to detect the movement within a direction angle of predetermined degrees or more with respect to the street light.

When a plurality of streetlights are provided, the streetlight controller may control an on/off operation of the plurality of street lights, and perform dimming control on the plurality of street lights according to a detection signal of each of the motion sensors equipped in the plurality of street lights.

The street light controller may perform dimming control on other street lights according to an on/off operation sequence of motion sensors provided in any one of the street lights.

Other features and aspects will be apparent from the following detailed description, the drawings, and the claims.

Figure 1:
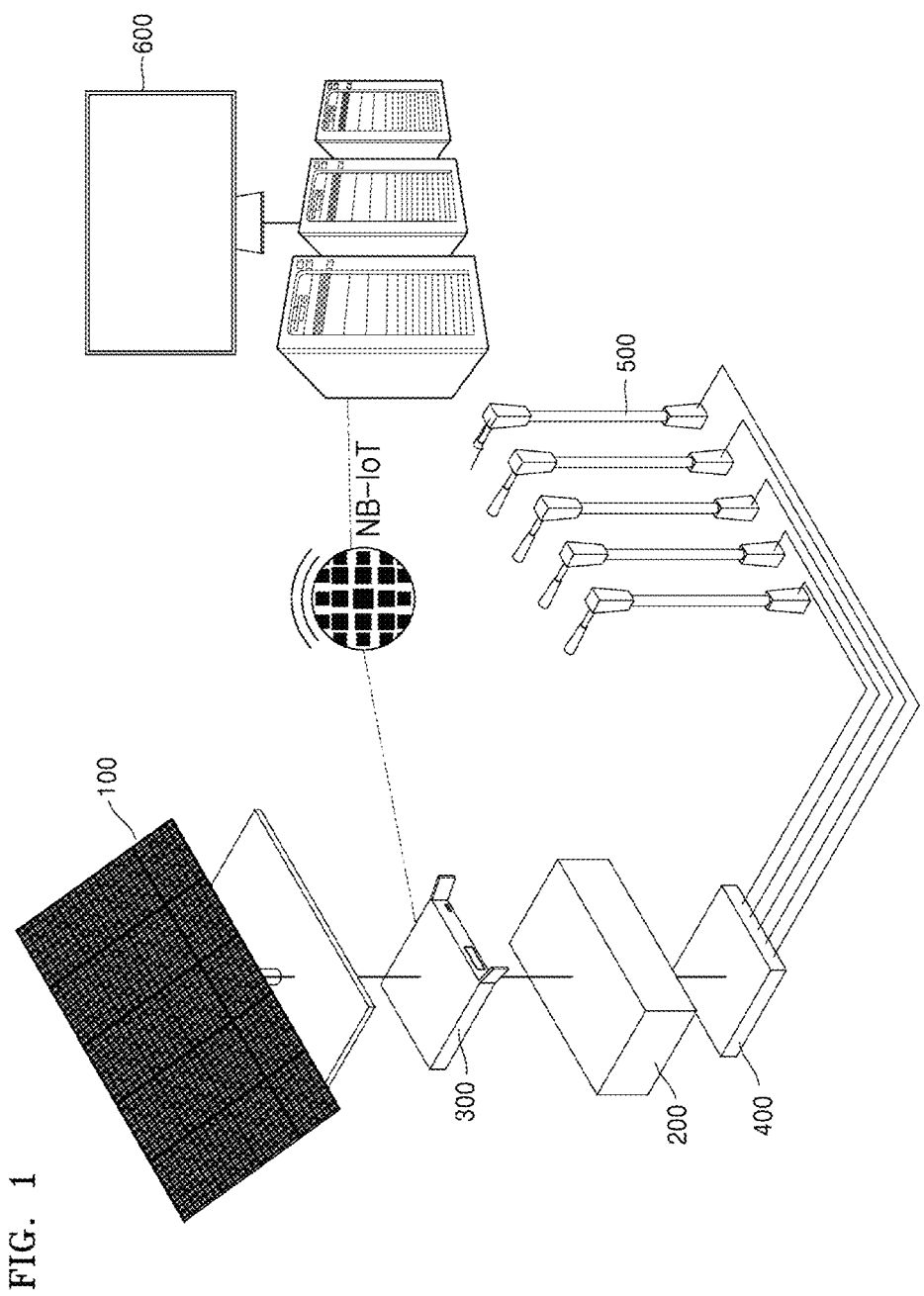
FIG. 1 is a reference diagram for explaining a system for street light lighting control and for Internet-of-Things (IoT) control for monitoring solar power generation according to the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, exemplary embodiments of the present invention will be described in detail with reference to the accompanying drawings to be easily implemented by those skilled in the art to which the present invention pertains. However, the present invention may be implemented in various different forms and is not limited to embodiments described herein.

FIG. 1 is a reference diagram for explaining a system for street light lighting control and for Internet-of-Things (IoT) control for monitoring solar power generation according to the present invention.

Referring to FIG. 1, a system for street light lighting control and for IoT control for monitoring solar power generation may include a solar panel 100, a battery 200, a solar controller 300, a street light controller 400, and one or more street lights 500.

The solar panel 100 uses sunlight to produce photovoltaic-based electricity. The solar panel 100 converts solar energy into electrical energy. When light is shone on the solar panel 100, a potential difference is generated, which causes the flow of electricity to the battery 200 connected to the solar panel 100.

The battery 200 stores the electricity produced by the solar panel 100. To this end, the battery 200 is electrically connected to the solar panel 100 through the solar controller 300. The battery 200 that stores input current when charged supplies the current to a load or an electronic device by discharging the current.

The solar controller 300 controls the battery 200 to store the electricity generated in the solar panel 100.

Figure 2:
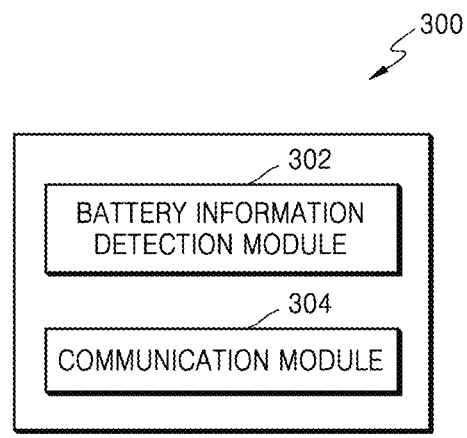
FIG. 2 is a block diagram illustrating an embodiment of a solar controller shown in FIG. 1.

FIG. 2 is a block diagram illustrating an example embodiment of the solar controller 300 shown in FIG. 1.

Referring to FIG. 2, the solar controller 300 includes a battery information detection module 302 and a communication module 304.

The battery information detection module 302 may detect remaining charge information and battery discharging time information as charge/discharge status information of the battery 200. The battery information detection module 302 may detect the remaining power of the battery 200 by detecting a voltage of the charging power of battery 200 that supplies power to the street lights 500. To this end, the battery information detection module 302 may include a voltage detect block that detects the voltage of the charging power of the battery 200 and generate a voltage signal corresponding to the detected voltage, or a current detect block that detects the amount of current of the charging power supplied to the battery 200 and generate a current signal corresponding to the detected amount of current. The battery information detection module 302 may detect an average power consumption value of the charging power through the detected voltage and the detected amount of current. Accordingly, the battery information detection module 302 may detect the remaining power amount of the charged battery 200 through the detected average power consumption value. The battery information detection module 302 may include an analog-to-digital (A/D) converter that converts a detected analog value into a digital value. The battery information detection module 302 may convert the remaining amount of the charging power into a digital value at a preset period.

In addition, the battery information detection module 302 calculates a battery discharging time corresponding to the detected remaining charge information. To this end, the battery information detection module 302 may include one or more of a central processing unit (CPU), an application processor (AP), and a communication processor (CP).

The battery information detection module 302 may calculate the detected remaining charge information to calculate the remaining discharging time of the power remaining in the battery 200. To this end, the battery information detection module 302 may use table information on a discharging time corresponding to the remaining power amount, and such table information is prestored in a memory.

The communication module 304 transmits the remaining charge information and the discharging time information detected by the battery information detection module 302 to a monitoring server 600. The communication module 304 transmits the remaining charge information and discharging time information through a wired or wireless communication network. In particular, the communication module 304 may transmit the remaining charge information and the discharging time information to the monitoring server 600 through a low-power wide area network (LPWAN). The LPWAN refers to a low-power wireless communication network that covers a very wide service area (10 km or more) and provides a communication rate of several hundreds of kilobits per second. For example, the LPWAN includes LoRaWAN, SIGFOX, LTE machine-type communications (LTE-MTC), narrow band Internet-of-Things (NB-IoT), and the like. Meanwhile, the communication module 304 may transmit the remaining charge information and the discharging time information through the Internet or a communication network for providing a high-speed service.

The street light controller 400 controls lighting of the one or more street lights 500 by using the electricity stored in the battery 200. To this end, the street light controller 400 is connected to the battery 200 through the solar controller 300.

The street light controller 400 may control lighting on/off of the street lights 500 using the power supplied from the battery 200, and may also perform dimming control on other street lights according to an on-ff operation sequence of motion sensors equipped in the street lights 500. The dimming control refers to an operation of controlling the brightness of the street lights 500 as well as an on/off operation of the street lights 500, which will be described in detail further below.

Also, the street light controller 400 detects lighting state information of the street lights. The lighting state information is information indicating the lighting on/off state of the street lights 500 and may include dimming state information of the street lights 500. Upon detecting the lighting state information of the street lights, the street light controller 400 transmits the detected lighting state information to the solar controller 300. Then, the solar controller 300 transmits the lighting state information transmitted from the street light controller 400 to the monitoring server 600.

At least one street light 500 is provided, and preferably, a plurality of street lights are provided. The street lights 500 are turned on by power supplied by the street light controller 400. The street lights 500 may be turned on to maximum brightness immediately after sunset according to sunset time information and sunrise time information by settings of the monitoring server 600 or an administrator, the operation time of the street lights 500 may be maximized through dimming control at night time, and when the charging power is insufficient, dimming control may be performed or the street lights 500 may be controlled to be turned on and off in an alternating manner to further reduce power consumption.

In addition, each of the street lights 500 includes a plurality of motion sensors that detect the movement of a person. The motion sensors are radially arranged to detect movement within a direction angle of predetermined degrees or more with respect to the street light.

Figure 3:
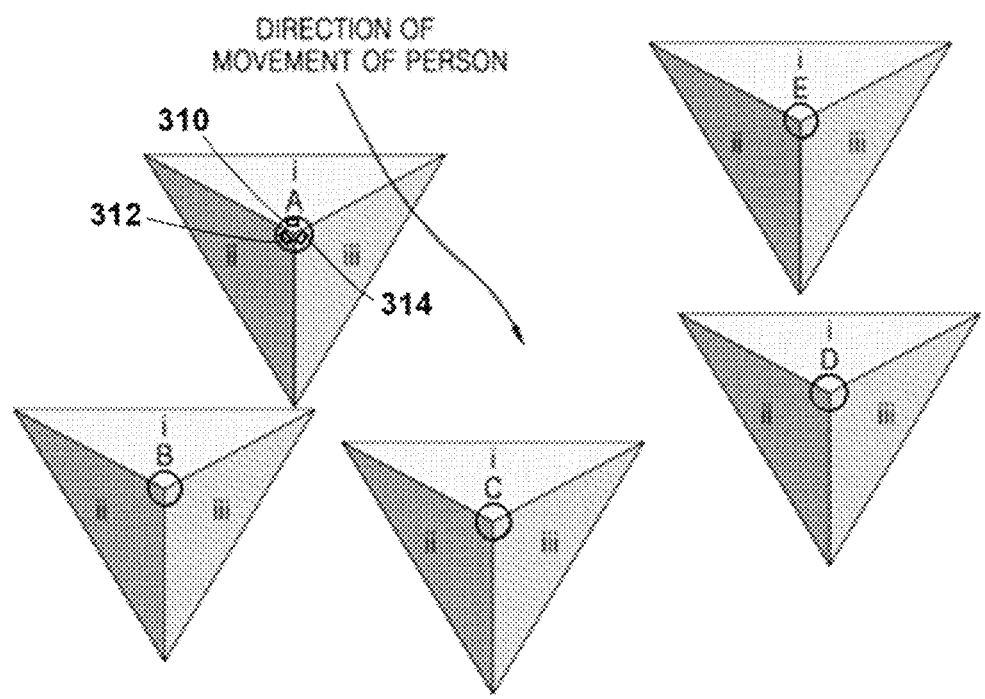
FIG. 3 is a reference diagram illustrating the control of a plurality of street lights using a system for street light lighting control and for IoT control for monitoring solar power generation according to the present invention.

FIG. 3 is a reference diagram illustrating the control of a plurality of street lights using a system for street light lighting control and for IoT control for monitoring solar power generation according to the present invention.

Referring to FIG. 3, in street light A, a first motion sensor (e.g., a motion sensor 310) is positioned in a first direction i, a second motion sensor (e.g., a motion sensor 312) is positioned in a second direction ii, and a third motion sensor (e.g., a motion sensor 314) is positioned in a third direction iii. Also, in street light B, a fourth motion sensor is positioned in the first direction i, a fifth motion sensor is positioned in the second direction ii, and a sixth motion sensor is positioned in the third direction iii. Moreover, in street light C, a seventh motion sensor is positioned in the first direction i, an eight motion sensor is positioned in the second direction ii, and a ninth motion sensor is positioned in the third direction iii. In addition, in street light D, a tenth motion sensor is positioned in the first direction i, an eleventh motion sensor is positioned in the second direction ii, and a twelfth motion sensor is positioned in the third direction iii. Also, in street light D, a thirteenth motion sensor is positioned in the first direction i, a fourteenth motion sensor is positioned in the second direction ii, and a fifteenth motion sensor is positioned in the third direction iii. In addition, in street light E, a sixteenth motion sensor is positioned in the first direction i, a seventeenth motion sensor is positioned in the second direction ii, and an eighteenth motion sensor is positioned in the third direction iii.

A street light controller 400 controls the on-off operation of a plurality of streetlights 500, and performs dimming control on the plurality of street lights 500 according to a detection signal of each of the motion sensors provided in the plurality of street lights 500. That is, the street light controller 400 may perform dimming control on other street lights according to an on-off operation sequence of motion sensors provided in any one of the street lights. To this end, the street light controller 400 may store lighting control information corresponding to the detection order of the motion sensors provided in each of the street lights 500 as table information. The table information may include lighting-on/off information or dimming control information of each street light corresponding to a direction of movement of a person.

For example, as illustrated in FIG. 3, assuming that a person enters in the first direction i of street light A and moves in the third direction iii, the first motion sensor and the third sensor of street light A sequentially detect the approach of the person. Accordingly, the street light controller 400 turns on street light A and performs dimming control to increase the lighting brightness. In addition, the street light controller 400 detects a direction of movement of the person according to sequential detection signals of the first sensor and the third sensor. Thereafter, the street light controller 400 turns on street light C positioned in the direction of movement of the person and performs dimming control to increase the lighting brightness. As a result, street light C is turned on according to the lighting control of the street light controller 400. In this case, the street light controller 400 may control the street lights (street light B, street light D, and street light E), other than street light C, to be turned off, or control them to reduce the lighting brightness.

The monitoring server 600 is a server that manages monitoring information of a solar power generation facility, and collects and manages, for example, state information related to the battery 200. In particular, the monitoring server 600 may receive information on the charging/discharging status of the battery 200 transmitted from the solar controller 300, and display the received information on a display screen. For example, the monitoring server 600 may receive remaining charge information or discharging time information of the battery 200 as the charging/discharging status information of the battery 200, and display the received information on the screen. The administrator may check the state information on the solar power generation facility through the displayed information.

According to the present invention, the charging/discharging status information of the battery, that is, remaining charge information and discharging time information, is detected and transmitted to a monitoring server through a LPWAN, and fine dimming control is performed on each street light, so that individual control related to lighting of the street lights can be easily performed and detailed lighting control of multiple street lights according to the direction of movement of a person is easily performed, thereby reducing power consumption.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for streetlight lighting control and for Internet-of Things (IoT) control for monitoring solar power generation, comprising:
   at least one streetlight and a plurality of motion sensors equipped in the at least one streetlight to detect movement of a person, the plurality of motion sensors radially arranged to detect the movement within a direction angle of predetermined degrees or more with respect to the at least one streetlight;
   a solar panel configured to generate photovoltaic-based electricity using sunlight;
   a battery configured to store the photovoltaic-based electricity generated by the solar panel and power the at least one streetlight;
   a solar controller electrically connected between the solar panel and the battery; and
   a streetlight controller configured to control lighting of the at least one streetlight using the photovoltaic-based electricity stored in the battery,
   wherein the solar controller includes a battery information detection module configured to determine remaining charge information of the battery and discharging time information of the battery, and a communication module configured to transmit the remaining charge information and the discharging time information to a monitoring server, wherein the battery information detection module is configured to detect a voltage or current associated with a charging power of the battery, determine an average power consumption value based on the detected voltage or current, and determine the remaining charge information of the battery based on the average power consumption value, wherein the battery information detection module is configured to determine the discharging time information based on the remaining charge information, and wherein the communication module is configured to transit the remaining charge information and the discharging time information to the monitoring server through a low-power wide area network (LPWAN).

2. The system of claim 1, wherein the streetlight controller is configured to detect lighting state information of the at least one streetlight and transmit the detected lighting state information to the solar controller, and wherein the solar controller is configured to transmit the lighting state information to the monitoring server.

3. The system of claim 1, wherein the at least one streetlight is a first streetlight and the plurality of motion sensors are a first plurality of motion sensors, wherein the system further comprises a second streetlight equipped with a second plurality of motion sensors to detect movement of the person, and wherein the streetlight controller is configured to control an on/off operation of the first streetlight and the second streetlight and perform dimming control on the first streetlight and the second streetlight according to a detection signal of each of the first plurality of motion sensors equipped in the first streetlight and of the second plurality of motion sensors equipped in the second streetlight.

4. The system of claim 3, wherein the streetlight controller is configured to perform dimming control on the first streetlight according to an on/off operation sequence of the second plurality of motion sensors equipped in the second streetlight.

5. The system of claim 1, wherein the communication module is configured to transit the remaining charge information and the discharging time information to the monitoring server through the LPWAN that has a coverage area of 10 km or more.

6. The system of claim 1, wherein the LPWAN includes one of LoRaWAN, SIGFOX, LTE-MTC, and narrow band Internet-of-Things.

\* \* \* \* \*